Jan. 23, 1962   D. R. HOLDREN   3,018,078
DEVICE FOR MOUNTING A CONDUIT TO A TANK
Filed Jan. 21, 1960   2 Sheets-Sheet 2

INVENTOR.
DONALD R. HOLDREN
BY
*Schmieding and Fultz*
ATTORNEYS

United States Patent Office 3,018,078
Patented Jan. 23, 1962

3,018,078
DEVICE FOR MOUNTING A CONDUIT TO A TANK
Donald R. Holdren, West Liberty, Ohio, assignor to Holdren Brothers, Inc., West Liberty, Ohio, a corporation of Ohio
Filed Jan. 21, 1960, Ser. No. 3,793
7 Claims. (Cl. 248—56)

This invention relates to a device for mounting a tube that extends through the wall of a tank.

The tube mount of the present invention is particularly adapted for use with dairy tanks since it is crevice free and hence thoroughly washable by spray means. Moreover, it is adjustable to permit vertical disposition of an intake tube leading to spray means in instances where said intake tube passes through an inclined cover of the type usually found on conventional dairy tanks.

In general, the tube mount of the present invention includes a resilient bushing provided with a central cylindrical hole through which a tube can be extended. The resilient bushing also includes an outer cylindrical surface.

A pair of resilient body portions surround the bushing and include inner spherical surfaces that engage said outer spherical surface on the bushing and form a seal therewith.

The mount further includes rigid washers that overlie the resilient body portions and clamping means which urge the resilient body portions into sealed engagement with the tank wall and the resilient bushing.

It is therefore an object of the present invention to provide an improved mount for securing an inlet or outlet tube to a tank that forms a liquid-tight seal that is crevice free and hence thoroughly washable by spray means.

It is another object of the present invention to provide a tube mount that includes flexible body portions that can be clamped together to conform with tank tops, bridges, or covers, that are angled, arched, or domed to increase their strength.

It is another object of the present invention to provide a mount for securing an inlet or outlet tube to a tank wall which mount includes relatively movable and contacting spherical clamping surfaces that permit longitudinal axis of the tube to be disposed at various angles relative to the tank wall.

It is another object of the present invention to provide an improved tube mount for a tank that permits ready adjustment of the length of the tube that extends into the tank.

It is still another object of the present invention to provide a mount for securing a tube to a tank wall by merely cutting a hole in the wall and clamping together the component parts of the mount thereto without welding.

Further objects and advantages of the present invention will be apparent from the following description, reference being had to the accompanying drawings wherein a preferred form of embodiment of the invention is clearly shown.

Figure 1:
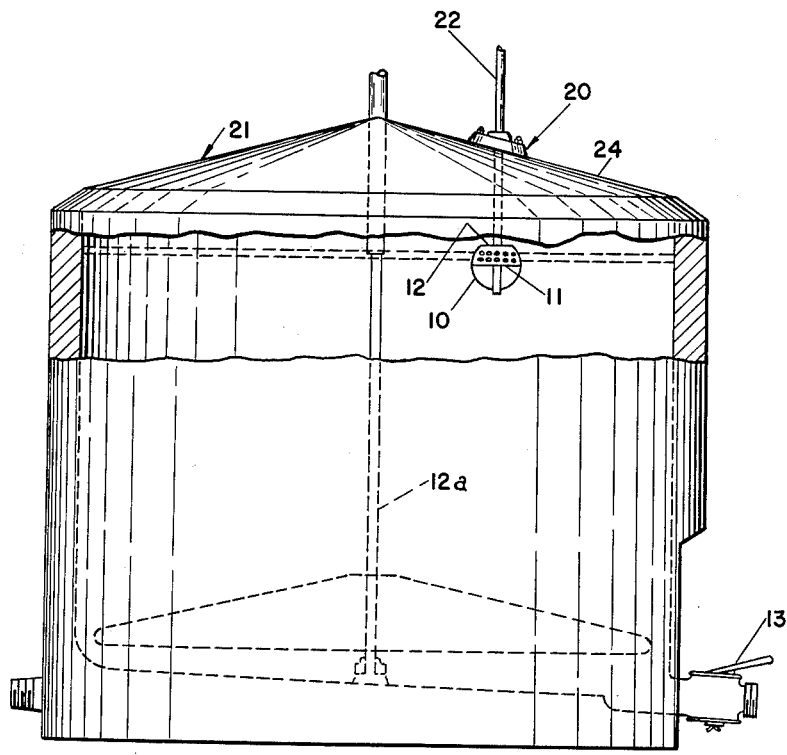
FIG. 1 is a side elevational view of a tank and tube provided with a tube mount constructed in accordance with the present invention.

Referring in detail to the drawing, FIG. 1 illustrates a tube mount indicated generally at 20 that secures a spray inlet tube 22 to a dairy tank 21 with the tube extended through an upper wall 24 of the tank.

A spray ball 10 provided with a plurality of orifices 11 is mounted on the lower end of spray inlet tube 22. Tank 21 further includes a stirring device or agitator 12 and a drain valve 13.

Tanks of this type are used by farms and dairies for storing milk. Hence, it will be understood that sanitation requirements dictate frequent washing of the interior of tank 21 and spray ball 10 is provided for that purpose. It is necessary that the spray be distributed over the entire inner surface of the tank and for that reason a top flat portion 12 on spray ball 10 is provided with a plurality of orifices that release jets upwardly in directions parallel with the longitudinal axis of inlet tube 22. Spray balls of this type are disclosed and discussed in detail in my co-pending application Serial No. 801,890 filed March 25, 1959.

The upwardly directed jets of cleansing fluid from the orifices on the top of spray ball 10 impinge on the portion of the inner surface of cover 24 that immediately surrounds inlet tube 22. The jets also impinge on the inner side of tube mount 20 and hence it will be understood that the tube mount must be of a crevice free and thoroughly washable construction in order to permit the jets of cleansing fluid to effectively clean the inner side of the tube mount.

Figure 2:
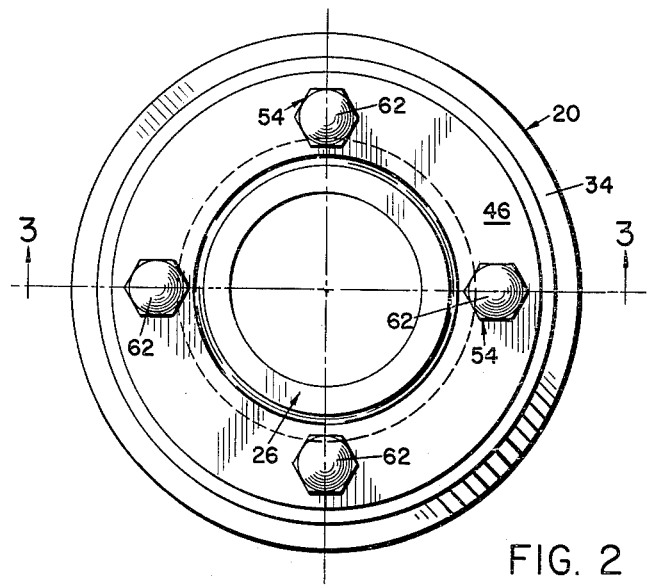
FIG. 2 is a tapered elevational view of the tube mount of FIG. 1.
Figure 3:
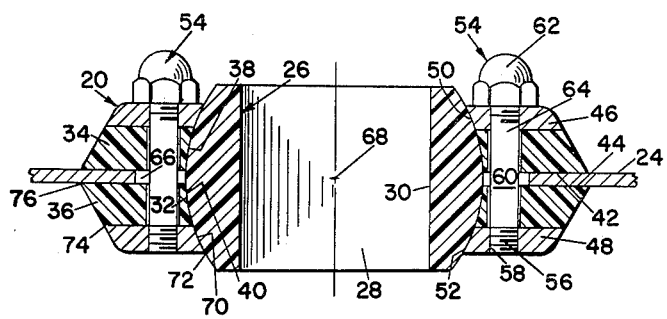
FIG. 3 is a sectional view of the tube mount of FIGS. 1 and 2, the section being taken along the line 3—3 of FIG. 2.

As seen in FIGS. 2 and 3, tube mount 20 includes a hole 28 having an annular inner surface 30 adapted to receive and engage the outer surface of tube 22. Bushing 26 further includes an outer surface 32 that conforms with the shape of the segment of a sphere the center of which lies at 68.

An outer body portion 34 and an inner body portion 36 form inner surfaces 38 and 40 that conform in curvature with spherical outer surface 32 of bushing 26.

Resilient bushing 26 and resilient body portions 34 and 36 are formed of a resilient plastic material such as nylon.

The term nylon may be defined as any long chain polymeric amide which has recurring amide groups as an integral part of the main polymer chain and which is capable of being formed into a filament in which the structural elements are oriented in the direction of the axis.

Body portions 34 and 36 are provided with spaced surfaces 42 and 44 that engage the outer and inner surfaces of tank wall 24.

An outer rigid washer 46 formed of steel or other rigid material overlies resilient body portion 34 and a second rigid washer 48 formed of steel or other rigid material overlies resilient body portion 36.

It is preferable to have the inner surfaces 50 and 52 engage the outer spherical surface 32 of bushing 26 and conform in shape with said spherical surface 32 so that clamping action is obtained throughout the axial length of bushing 26. A plurality of clamping elements indicated generally at 54 include threaded lower ends 56 in threaded engagement with holes 58 in inner rigid washer 48 and a shank portion 60 extended freely through holes in body portion 34, body portion 36, and rigid washer 46. A plurality of nuts 62 are mounted on threaded upper ends 64 of the clamping means 54 such that when nuts 62 are tightened rigid washers 46 and 48 are moved towards one another whereby surfaces 38 and 40 on the body portion and surfaces 50 and 52 on the rigid washers effect wedging action on spherical bushing surface 32 and urge the inner surface of the bushing into sealed engagement with the outer surface of tube 22.

With reference to FIG. 3 it will be understood that the rigid inner edge 72 on washers 46 and 48 are urged inwardly into intimate contacting relationship with the resilient outer spherical surface 32 of bushing 26. This eliminates the possibility of a crevice being present at 72, even though the cleaning of the spherical surface might be slightly imperfect.

It will further be understood from considering FIG. 3 that the existence of crevices at 74 and 76 is prevented by the resiliency of the washers 34 and 36. When clamping means 54 are tightened the outer edge of washers 46 and 48 will be urged into intimate contact with the resilient washers 34 and 36 at the location 74 and also the washers 34 and 36 will be urged into intimate contact with the tank top 24 at the locations 36.

In operation, in order to install tube 22 in mounted relationship with tank 24 a hole 66 is cut in tank wall 24 and body portion 36 and rigid washer 48 are positioned against the inner surface of the tank wall with the shank 60 of the clamping means extended to the exterior of the tank through hole 66. Bushing 26 is next set in place with its outer cylindrical surface 32 resting on inner surface 40 of resilient body portion 36. Outer resilient body portion 34 and outer rigid washer 46 are next positioned on the shank portions 60 of clamping means 54 and nuts 62 are screwed onto the upper threaded ends of the clamping means. Before nuts 62 are tightened tube 22 is extended through hole 28 and bushing 26 and the angle of the longitudinal axis of the tube, relative to the plane of the tank wall, is adjusted by rotating bushing 26 about a center 68 of the previously mentioned contacting spherical surfaces. The axial extent of tube 22 into tank 20 is also adjusted prior to tightening nuts 62.

While the form of embodiment of the present invention as herein disclosed constitutes a preferred form, it is to be understood that other forms might be adopted, all coming within the scope of the claims which follow:

I claim:

1. A mount for a tube extended through an opening in the wall of a tank, said mount comprising, in combination, a resilient bushing including a cylindrical hole conforming in diameter with the outside diameter of said tube, said bushing including an outer surface that forms a first converging portion that converges towards an outer end of said bushing and a second converging portion that converges towards an inner end of said bushing; an inner resilient body portion in surrounding engagement with said bushing and of greater diameter than said opening; an outer resilient body portion in surrounding engagement with said bushing and of greater diameter than said opening, said body portions including spaced confronting surfaces for engaging opposite sides of said tank wall; an inner rigid washer overlying said inner body portion and including an inner edge that converges inwardly in wedging engagement with said first converging portion of said bushing; an outer rigid washer overlying said outer body portion and including an inner edge that converges outwardly in wedging engagement with said second converging portion of said bushing; and clamping means connected between said rigid washers for urging said body portions into sealed engagement with said bushing and said tank wall and for moving said rigid washers towards one another whereby said converging inner edges wedge said resilient bushing into frictional engagement with said tube.

2. A mount for a tube extended through an opening in the wall of a tank, said mount comprising, in combination, a resilient bushing including a cylindrical hole conforming in diameter with the outside diameter of said tube, said bushing including an outer surface that forms a first converging portion that converges towards an outer end of said bushing and a second converging portion that converges towards an inner end of said bushing; an inner resilient body portion in surrounding engagement with said bushing and of greater diameter than said opening; an outer resilient body portion in surrounding engagement with said bushing and of greater diameter than said opening, said body portions including spaced confronting surfaces for engaging opposite sides of said tank wall; an inner rigid washer overlying said inner body portion and including a hole the wall of which converges toward an inner radially inwardly facing annular hole edge that surroundingly engages said inner surface of said bushing; an outer rigid washer overlying said outer body portion and including a hole the wall of which converges toward an outer radially inwardly facing annular hole edge that surroundingly engages said outer surface of said bushing; and clamping means connected between said rigid washer for urging said body portions into sealed engagement with said tank wall and said bushing and for moving said rigid washers towards one another whereby said converging hole walls edge said resilient bushing into frictional engagement with said tube.

3. A mount for a tube extended through an opening in the wall of a tank, said mount comprising, in combination, a resilient bushing including a cylindrical hole conforming in diameter with the outside diameter of said tube, said bushing including an outer surface that forms a first converging portion that converges towards an outer end of said bushing and a second converging portion that converges towards an inner end of said bushing; an inner resilient body portion of greater diameter than said opening and including an outwardly converging inner surface engaging said second converging portion of said bushing; a second resilient body portion of greater diameter than said opening and including an outwardly converging inner surface in engagement with said first converging portion of said bushing, said body portions including spaced confronting surfaces for engaging opposite sides of said tank wall; an inner rigid washer overlying said inner body portion and including an inner edge that converges inwardly in wedging engagement with said first converging portion of said bushing; an outer rigid washer overlying said outer body portion and including an inner edge that converges outwardly in wedging engagement with said second converging portion of said bushing; and clamping means connected between said rigid washer for urging said body portions into sealed engagement with said tank wall and said bushing and for moving said rigid washers towards one another whereby said converging inner edges wedge said resilient bushing into frictional engagement with said tube.

4. The tube mount defined in claim 1 wherein said outer surface of said bushing is spherical and said resilient body portions include conforming spherical surfaces engaging said spherical surfaces of said bushing whereby said bushing can be rotated in said body portions about a center of said spherical surfaces.

5. The tube mount defined in claim 2 wherein said outer surface of said bushing is spherical and said resilient body portions include conforming spherical surfaces engaging said spherical surfaces of said bushing whereby said bushing can be rotated in said body portions about a center of said spherical surfaces.

6. The tube mount defined in claim 3 wherein said outer surface of said bushing is spherical and said resilient body portions include conforming spherical surfaces engaging said spherical surfaces of said bushing whereby said bushing can be rotated in said body portions about a center of said spherical surfaces.

7. A mount for a tube extended through an opening in the wall of a tank, said mount comprising, in combination, a resilient bushing having a spherical outer surface; first and second spaced resilient body portions having inner spherical surfaces conforming with and engaging said outer spherical surface; first and second rigid washers overlying said resilient body portions, each of said washers including a hole forming an inwardly facing annular edge conforming with and engaging said spherical outer surface; and clamping means for moving said rigid washers towards one another and for pressing said annular edges against said spherical surface to form crevice free seals for applying a radially inwardly directed force to said resilient bushing whereby said bushing frictionally grips said tube, and for urging said resilient body portion into sealed engagement with said tank wall.

References Cited in the file of this patent

UNITED STATES PATENTS

| | | |
|---|---|---|
| 343,769 | Levi | June 15, 1886 |
| 909,263 | Walters | Jan. 12, 1909 |
| 1,437,372 | Walters | Nov. 28, 1922 |
| 2,717,792 | Pelley | Sept. 13, 1955 |
| 2,919,150 | Baker | Dec. 29, 1959 |

FOREIGN PATENTS

| | | |
|---|---|---|
| 112,450 | Switzerland | Oct. 16, 1925 |